United States Patent
Stark

(10) Patent No.: US 6,173,855 B1
(45) Date of Patent: Jan. 16, 2001

(54) TANK CLOSING DEVICE FOR A FILLER NECK OF A CONTAINER

(75) Inventor: Thomas Stark, Waiblingen (DE)

(73) Assignee: Andreas Stihl AG & Co.

( * ) Notice: Under 35 U.S.C. 154(b), the term of this patent shall be extended for 0 days.

(21) Appl. No.: 08/911,237

(22) Filed: Aug. 15, 1997

(30) Foreign Application Priority Data

Aug. 15, 1996 (DE) .......................................... 296 14 077 U

(51) Int. Cl.$^7$ .................................................... B65D 41/06
(52) U.S. Cl. ............... 220/295; 220/203.12; 220/203.27; 220/203.29; 220/284; 220/303; 220/304; 220/375; 220/DIG. 32; 220/DIG. 33
(58) Field of Search ......................... 220/203.12, 203.13, 220/203.19, 203.27, 203.29, 284, 295, 298, 300, 301, 303, 304, 375, DIG. 32, DIG. 33

(56) References Cited

U.S. PATENT DOCUMENTS

| | | |
|---|---|---|
| 3,027,043 | 3/1962 | Nestic . |
| 4,162,021 | 7/1979 | Crute . |
| 4,162,741 | * 7/1979 | Walker et al. ........................ 220/203 |
| 4,185,751 | * 1/1980 | Moore et al. ........................ 220/203 |
| 5,165,565 | * 11/1992 | Schlessmann et al. .............. 220/304 |
| 5,169,015 | * 12/1992 | Burke ................................... 220/203 |

\* cited by examiner

Primary Examiner—Stephen K. Cronin
(74) Attorney, Agent, or Firm—Robert W. Becker & Associates

(57) ABSTRACT

A tank closing device for a container includes a filler neck at the container and a closing member received in the filler neck. A closing cap is securable at the filler neck by a bayonet fitting. A sealing element is arranged at the closing member. A spring rests at the closing cap and biases the sealing element against the filler neck. The closing cap has a top face and a gripping member projecting upwardly from the top face. The bayonet fitting includes at least three socket elements at a circumferential surface of the closure cap or the filler neck and includes at least three dogs cooperating with the at least three socket elements and arranged on an opposing circumferential surface of the closing cap or the filler neck. The socket elements or the dogs or both the socket elements and the dogs are unevenly distributed over the circumferential surface, respectively.

46 Claims, 6 Drawing Sheets

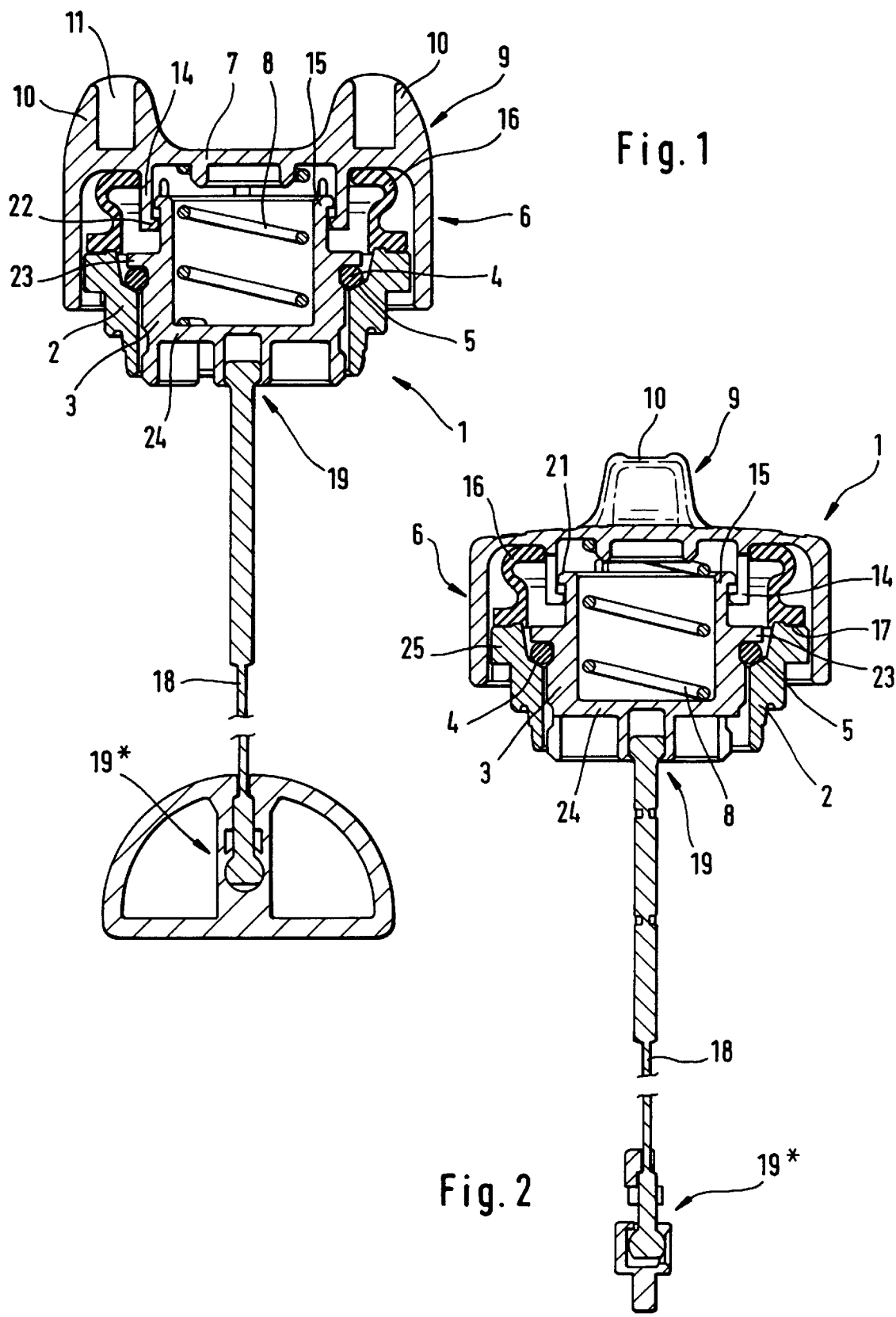

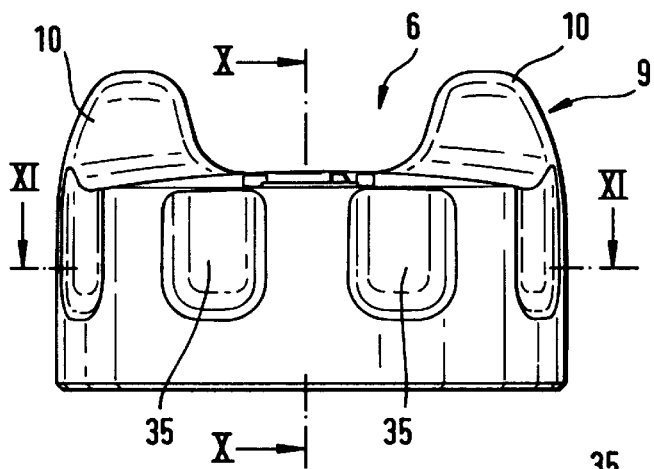
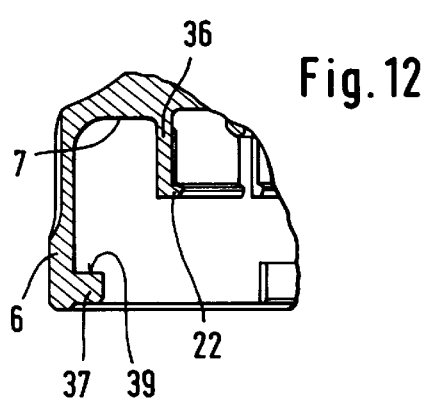
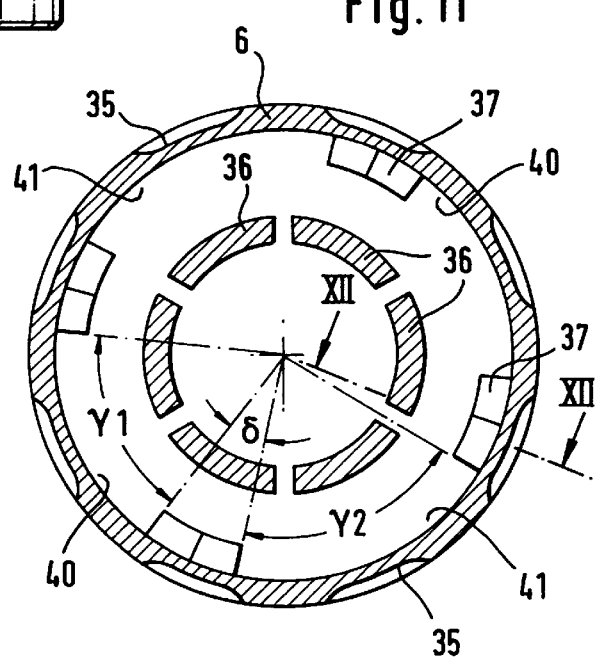
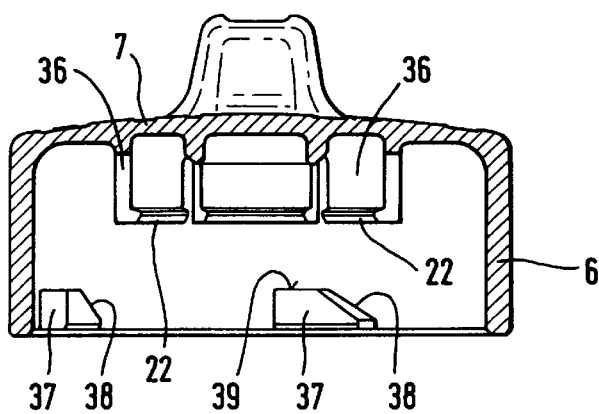

TANK CLOSING DEVICE FOR A FILLER NECK OF A CONTAINER

BACKGROUND OF THE INVENTION

The invention relates to a tank closing device for a filler neck of a container, in particular of an operating liquid or fuel tank of a transportable work tool such as a disk grinder, a motorised chain saw, an independent cutting tool or similar.

A closing device for a radiator is known from U.S. Pat. No. 3,027,043. In this device, a closing member is biassed against the filler neck by a spring and a sealing member is arranged between the closing member and the filler neck. The spring biassing the closing member is braced against a closing cap which can be secured on the filler neck by means of a bayonet fitting. In this design, the closing cap has two radial shoulders, which are used for handling purposes when opening or closing the cap. These shoulders can be used to apply increased torque.

In many cases, however, the mounting design of containers and their filler necks is so restricted in terms of space that radial shoulders can not always be provided on closing caps.

Furthermore, a design which provides only two oppositely lying locking members for the bayonet fastening causes the filler cap to be tilted transversely, which means that the force applied to the filler cap is very uneven. This can cause the closing member to lift at a point on the circumference of the filler neck so that a momentary look is caused in this manner.

The object of the present invention, therefore, is to provide a tank closing device for a filler neck of a container of the aforementioned kind, which is easy to operate even if the design is restricted in terms of space, as well as functionally safe and provides a reliable seal under the most varied of operating conditions.

SUMMARY OF THE INVENTION

A tank closing device for a container according to the present invention is primarily characterized by:

a filler neck at the container;

a closing member received in the filler neck;

a closing cap securable at the filler neck by a bayonet fitting;

a sealing element arranged at the closing member;

a spring resting at the closing cap and biasing the sealing element against the filler neck;

the closing cap having a top face and a gripping member projecting upwardly from the top face;

the bayonet fitting comprising at least three socket elements at a circumferential surface of the closure cap or the filler neck and comprising at least three dogs cooperating with the at least three socket elements and arranged on an opposing circumferential surface of the closing cap or the filler neck;

wherein the socket elements or the dogs or both the socket elements and the dogs are unevenly distributed over the circumferential surface, respectively.

At least one spacing between two adjacent ones of the dogs in a circumferential direction is different from another spacing between two adjacent ones of the dogs.

At least one spacing between two adjacent ones of the socket elements in a circumferential direction is different from another spacing between two adjacent ones of the socket elements.

At least one of the dogs has a circumferential length that is different from a circumferential length of another one of the dogs.

At least one of the socket elements has a circumferential length that is different from a circumferential length of another one of the socket elements.

Four of the dogs and four of the socket elements are provided.

Diametrically opposed ones of the dogs are of identical design.

Diametrically opposed ones of the socket elements are of identical design.

A spacing between three of the dogs is such that a first spacing between a first and a second one of the dogs extends over an angle of 58° and a second spacing between a second and a third one of the dogs extends over an angle of 72°.

The dogs have a circumferential length of 25°.

Two of the socket elements have a circumferential length of 53°.

Two of the socket elements have a circumferential length of 65°.

A spacing between two adjacent ones of the socket elements is 30°.

Two of the socket elements have an end stop at a rearward end thereof in a closing direction of the bayonet closure.

The socket elements have a run-in slope at a forward end thereof in a closing direction of the bayonet closure, further have a section of maximum height adjacent to the run-in slopes, and further have a bearing section, having a height reduced relative to the section of maximum height, positioned adjacent to the section of maximum height.

Two of the socket elements have an end stop at a rearward end thereof in a closing direction of the bayonet closure, wherein the end stops have an incline at a side thereof facing an adjacent one of the socket elements.

The gripping member comprises a first and second diametrically opposed shoulders, the shoulders having an orifice at front ends thereof.

The closing cap is beaker-shaped and has a bottom comprising a mounting fixture for securing the closing member.

The mounting fixture is comprised of a plurality of ring segments having free ends with radial shoulders.

The closing member has an end face snap-connected to the mounting fixture.

The tank closing device may further comprise a sealing membrane positioned concentrically to the closing member, the sealing membrane sealingly resting on the closing cap and an annular surface of the filler neck.

The filler neck is an annular body adaptable to the container.

The filler neck has an internal diameter and a portion for guiding the closing member, wherein the portion has a length of 0.4 times the internal diameter.

The main advantages of the invention reside in the fact that by arranging a pushing member on the top face of the closing cap, it is not necessary to allow for any space for the structural design other than that of the circumferential surface of the closing cap since there are at least three dogs and socket elements, an even distribution of forces is guaranteed without any tendency to tilt laterally. Due to the fact that the socket elements and/or the dogs are disposed in an uneven distribution around the circumferential surface, the closing cap can only be positioned at a turning angle relative to the median longitudinal axis of the filler neck such that the gripping member assumes a predetermined direction relative to the container or the transportable work tool when the tank closing device is shut. This means that the tank closing device can not be opened unwittingly because when closed, the gripping member does not provide a gripping surface which can be operated in the turning direction.

The uneven layout of the dogs and socket elements relative to the circumferential surface can be achieved simply by making at least one of the spacing distances between two respective dogs in the circumferential direction different in size from another spacing distance. Alternatively, varying the lengths of the socket elements can be used as a means of producing an uneven layout, in which case an advantage can be gained by giving one of the socket elements or dogs in the circumferential direction a different length from another of the socket elements or dogs.

In order to produce as even an application of force across the entire circumference of the filler cap as possible, there is an advantage to be had if four socket elements and dogs are provided. This being the case, it is advantageous to use a distribution such that socket elements or dogs lying opposite one another are of the same design. The desired unevenness is then provided by two differing sections, each arranged in a respective half circumference. A preferred embodiment of this design is one in which a distance of approximately 58° is provided between two successive dogs and the subsequent distance is then approximately 72°, whilst the dogs extend over an angle of approximately 25°.

The socket elements are purposely designed to be of different lengths, so that two socket elements extend over an angle of approximately 53° and the other two socket elements over an angle of approximately 65°. The distances between two successive socket elements will then be approximately 30°.

In order to ensure that the filler cap assumes a defined position when closed and thus an accurate alignment of the gripping member, two of the socket elements are provided with end stops at their rear ends in the direction in which the bayonet fitting is fastened. As a means of facilitating handling when operating the tank closing device in the closing direction, the socket elements also have a run-in slope at their front ends in the closing direction. A section of maximum height adjoins the run-in slope of the socket elements, following which is a bearing section of a lesser height. On the side delimiting the spacing to the next socket element, the end stops are provided with an incline, by means of which a component in the direction of closing is imparted to the filler cap as force is applied axially.

For optimizing the amount of material required as well as the weight, the gripping member is designed to have two diametrically arranged projections having orifices on their front faces. In order to ensure that the tank closing device is protected against soiling as much as possible, it is an advantage to embody the tank closing device as of a beaker shape and its cylindrical section overlaps the filler neck. For practical purposes, a mounting fixture for the closing member is provided on the base of the filler cap, this mounting fixture consisting of several annular segments with radial projections arranged on their free ends. The closing member is so designed that it can be located in the mounting fixture by one of its end faces.

As a further safety precaution against leakage of any operating fluid or fuel, a sealing membrane is provided concentrically in the closing member and lies against the filler cap on one side and against an annular surface of the filler neck on the other to form a seal. For practical purposes, the filler neck may be provided on the container in the form of an adjustable ring, which means, for example, that the container can be manufactured without regard for the exact configuration of the filler neck. This also provides a filler neck that will be of standard design and can be used for containers of different designs. In order to centre the closing member relative to the filler neck, the closing member is inserted in the filler neck over a specific length. This will prevent the possibility of crooked positioning, which could be detrimental to the sealing capability. It is deemed to be particularly appropriate for the filler neck to be of a length which is some 0.4 times the internal diameter of the filler neck.

BRIEF DESCRIPTION OF THE DRAWINGS

An embodiment of the invention will be described below with reference to the drawings. Of the drawings:

FIG. 1 is a longitudinal section through a tank closing device

FIG. 2 is a longitudinal section representing a rotation about 90°

FIG. 9 is a side view of the closing cap,

FIG. 10 is a section along the line X—X of FIG. 9,

FIG. 11 is a section along the line XI—XI of FIG. 9,

FIG. 12 is a section along the line XII—XII of FIG. 9,

DESCRIPTION OF PREFERRED EMBODIMENTS

Figure 3:
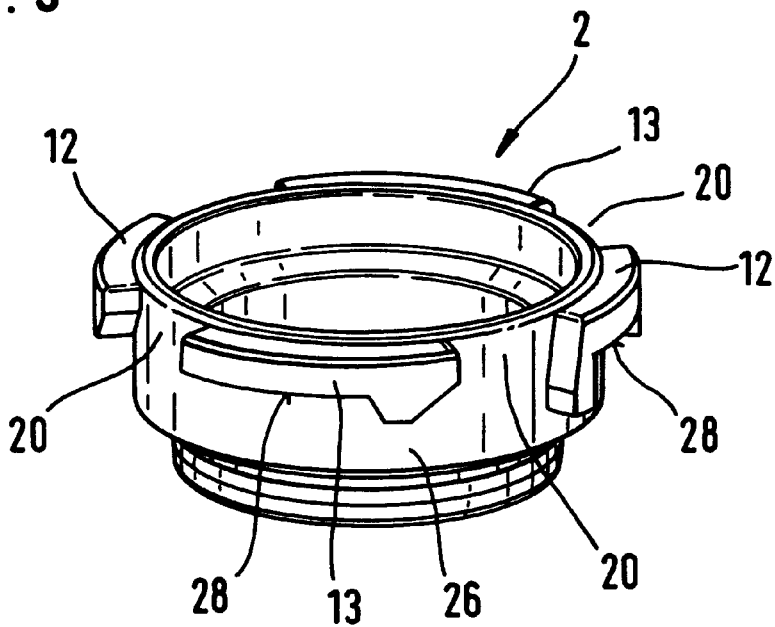
FIG. 3 is a perspective view of the filler neck.

FIGS. 1 and 2 show an axial section through a tank closing device 1, which has a filler neck 2 with a closing member 3 housed therein. The closing member 3 has a radial flange 23, in front of which a sealing ring 4 is arranged, resting on a sealing surface 5 of the filler neck 2.

Extending across the filler neck 2 and the closing member 3 is a closing cap 6, which is essentially of a beaker-shaped design and has on its base 7 a mounting fixture 14 in which the closing member 3 is mounted by a longitudinal sliding action. For this purpose, an end face 15 of the closing member 3, shaped to form a radial collar 21, projects into the mounting fixture 14, which is provided with radial shoulders 22 directed inwards. The closing member 3 is of a beaker-shaped design and has a compression spring 8 arranged between its base 24 and the base 7 of the closing cap 6, which biasses the closing member 3 and in turn the sealing ring 4 against the sealing surface 5 of the filler neck 2.

The cylindrical section of the closing cap 6 overlaps a radial shoulder 25 of the filler neck 2 and the closing member 3 is positioned fully protected in the filler neck 2. The manner in which the closing cap 6 is fastened on the filler neck 2 by means of a bayonet fitting will be explained below with reference to FIGS. 3 to 12. Arranged between the base 7 of the closing cap 6 and an annular surface 17 of the filler neck 2 is a sealing membrane 16, which provides a tight fit at both the base 7 of the closing cap and against the annular surface 17 of the filler neck 2, irrespective of any axial displacement between the closing member 3 and the closing cap 6.

Provided on the top face of the closing cap 6 is a gripping member 9, which, in the embodiment illustrated, is in the form of two shoulders 10 arranged in the vicinity of the circumferential edge. Orifices 11 are provided in the shoulders 10, so as to reduce the amount of material required for manufacture. Secured to the lower face of the base 24 of the closing member 3 by means of a clip connector 19 is a flexible element 18, which may consist of a braided cord with synthetic ends suitable for use with the clip connector. The other end of the flexible element 18 is secured by means of a clip connector 19* in a corresponding receiving means in the internal wall of the container. However, a shackle which could move within the container could also be provided at this end in order to prevent any slipping movement out of the filler neck 2.

FIG. 3 shows a perspective view of the filler neck 2, which consists of a annular body 26 with two first socket elements 12 and two second socket elements 13 arranged on the mantle surface. The two first socket elements 12 are arranged diametrically opposite one another and the second socket elements 13 are arranged likewise. The socket elements 12 and 13 are used to provide a bayonet fitting for the matching dogs provided on the closing cap 6, whose design will be described in more detail with reference to FIGS. 9 to 12. Provided between each two adjacent socket elements 12 and 13 is a spacing 20 for inserting the dogs provided on the closing cap 6, which then engage the socket elements 12 and 13 coming into contact with bearing sections 28 when the closing cap 6 is turned.

Figure 4:
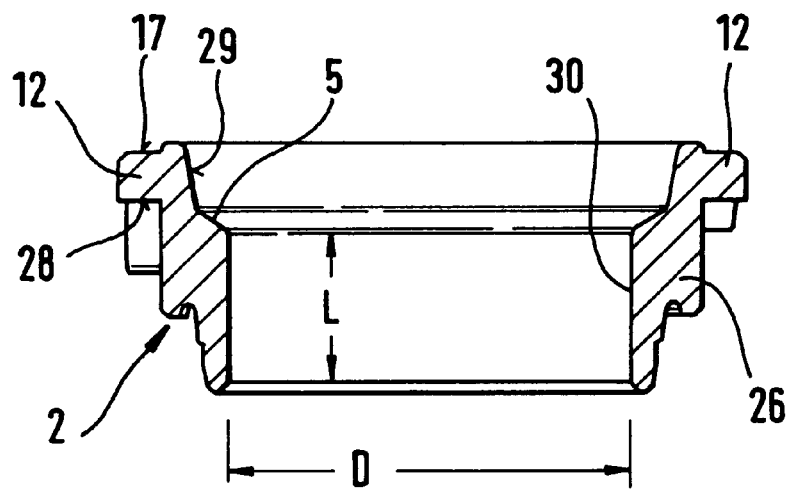
FIG. 4 is a longitudinal section through the filler neck of FIG. 3.

FIG. 4 shows an axial section through the filler neck 2, whose annular body 26 has an annular surface 17 at the upper end. Adjacent to this annular surface 17 are the first socket elements 12, on the underside of which the bearing section 28 is provided. The internal contour of the annular body 26 is a conical section 29 used for inserting the closing member. Adjoining this conical section 29 is the sealing surface 5, which acts as a mounting surface for the sealing ring. The sealing surface 5 describes a cylindrical section 30, extending preferably over an axial length L, which is about 0.4 times the diameter D of the cylindrical section 30.

Figure 5:
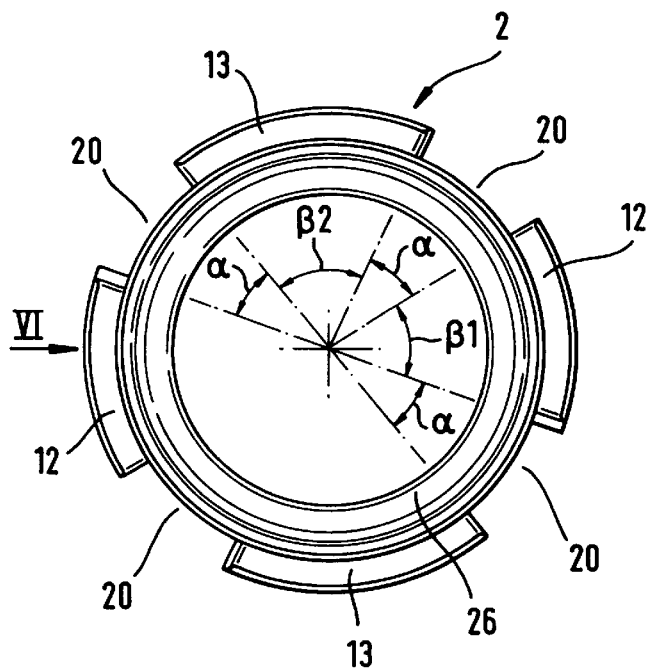
FIG. 5 is a view from above of the filler neck of FIG. 4.

FIG. 5 shows a view from above of the filler neck 2 illustrated in FIG. 4. It can be seen from this drawing that two first socket elements 12 are arranged exactly diametrically opposite one another on the annular body 6; likewise, two second socket elements 13 lie diametrically opposite one another. This drawing also illustrates the fact that the first socket elements extend over a smaller arc angle β1 than the second socket elements extending over the larger arc angle β2. In the embodiment illustrated, the angle β1 is approximately 53°, whilst the angle β2 is 67°. A spacing 20 is provided between each two adjacent socket elements 12, 13, these spacings 20 being of essentially the same size and extending over an angle a of approximately 30°.

Due to the differing sizes of the angles β1 and β2, the angle between the radial median lines of the spacing distances 20 is 83° at the first socket element 12 and 97° at the second socket element 13, so that the closing cap 6 can be positioned on the filler neck in two defined positions only. Since the angle about which the closing cap is rotated about its longitudinal axis is restricted by the end stops 31 shown in FIG. 6 on the socket elements 12, the closing cap 6 assumes a defined position when the tank closing device is in the closed state, in which the shoulders 10 of the closing cap 6 which form the gripping member 9 are accurately aligned in a predetermined direction.

Figure 6:
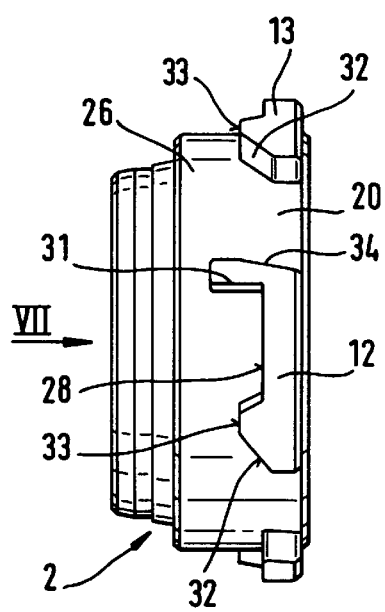
FIG. 6 is a view in the direction of the arrow VI of FIG. 5.

FIG. 6 also shows quite clearly that both the first socket element 12 and the second socket element 13 have a run-in slope 32 on their front ends, which is adjoined by a section 33 of maximum height in the closing direction of the bayonet fitting. Arranged after the section 33 is the bearing section 28, already described, the end of which is defined by the end stop 31. On its side delimiting with the spacing 20 to the subsequent socket element, the end stop 31 has an incline 34.

Figure 7:
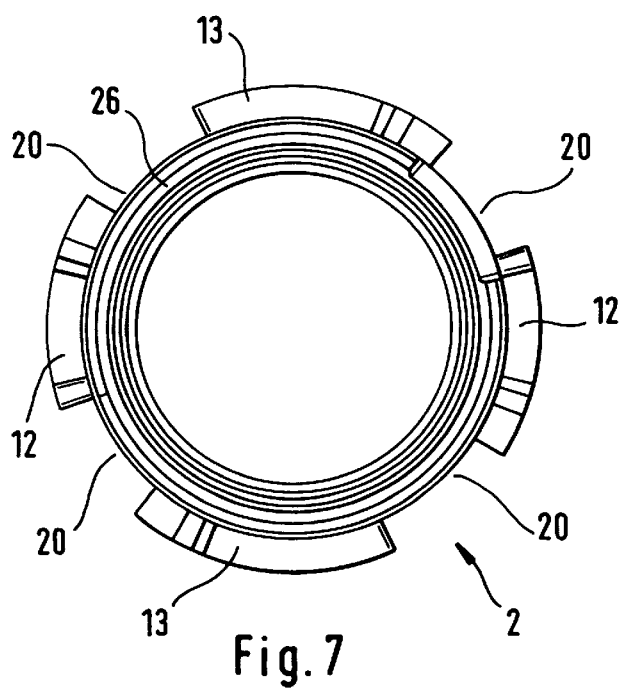
FIG. 7 is a view in the direction of the arrow VII in FIG. 6.
Figure 8:
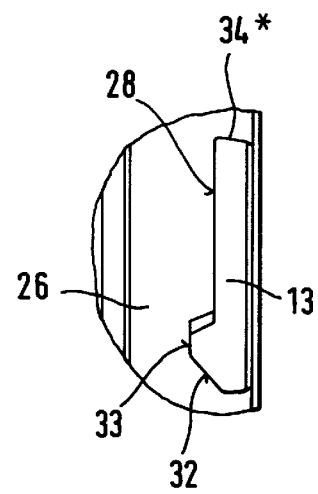
FIG. 8 is a section of the filler neck with a socket element.

FIG. 7 shows a view in the direction of the arrow VII of FIG. 6. The reference numbers used for common parts are the same as those used for FIGS. 5 and 6. FIG. 8 shows a cut-out of the annular body 26 with a side view of the first socket element 12 in its full extension with a run-in slope 32, a section 33 of maximum height and a bearing section 28. The socket element 12 has an incline 34* at the rear end of the bearing section 28.

FIG. 9 illustrates a side view of the closing cap 6, from which it can be seen that several spherical depressions 35 are arranged at the circumferential edge of the closing cap, which provides an improved grip on the closing cap 6. The shoulders 10 forming the gripping member 9 are located on the top face of the closing cap 6.

FIG. 10 illustrates a section along the line X—X of FIG. 9. From this it can be seen that the mounting fixture 14 on the base 7 consists of several ring segments 36, on the front ends of which the inwardly directed radial shoulders 22 are provided. When the closing member 3 is assembled on the closing cap 6, the mounting fixture 14 formed by these ring segments 36 permits a temporary flaring so that the radial collar formed on the end face 15 of the closing member 3 can be inserted in the mounting fixture. Located on the internal mantle area at the open edge of the cylindrical section of the closing cap 6 are dogs 37 which are provided with run-in slopes 38 at their front ends in the direction in which the bayonet fitting is closed. The dogs 37 engage behind the socket elements on the filler neck.

FIG. 11, illustrating a section along the line XI—XI of FIG. 9, shows that six ring segments 36 are provided in total to form the mounting fixture 14. Eight spherical depressions 35 are evenly distributed across the outer circumference of the closing cap 6. In total, four dogs 37 are arranged on the inner circumferential surface of the closing cap 6, such that each of the dogs extends over an angle δ of approximately 25°. The distances between two adjacent dogs 37 are different so that two diametrically opposite distances 40 extend over an angle γ1 of approximately 58°. The distances 41 respectively offset from the distances 40 extend over an angle γ2 of approximately 72°. As a result of this layout, the distribution of angles between the radial median lines of the dogs 37 alternates between 83° and 97°, matching the corresponding angle layout of the filler neck as illustrated in FIG. 5.

FIG. 12 shows a section along the line XII—XII of FIG. 11, in which this section is taken through the dog 37. In the closed state, the side 39 of the dog 37 facing the base 7 of the closing member 6 rests on the bearing section 28 of the socket element 12 or 13 of the filler neck 2 illustrated in FIGS. 3 to 7.

Figure 13:
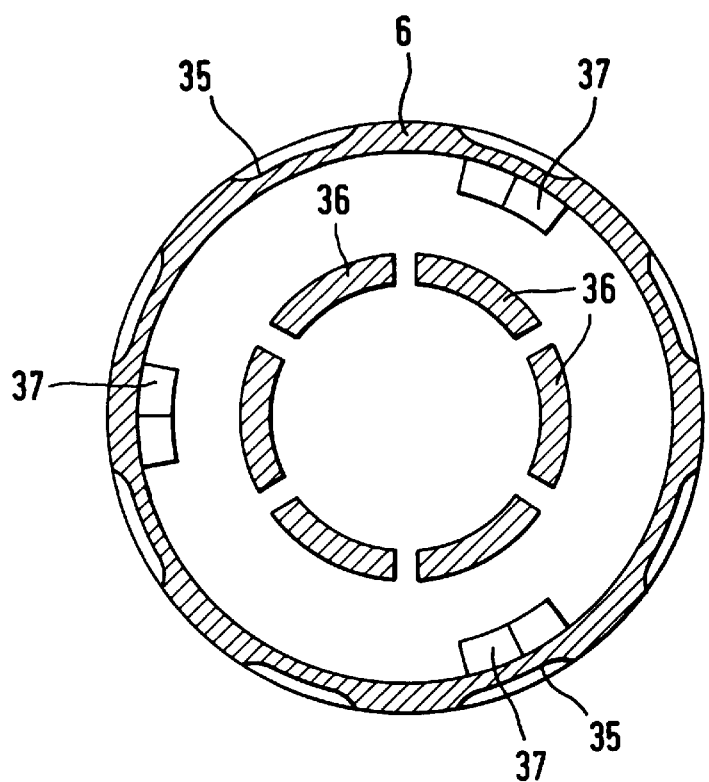
FIG. 13 shows a second embodiment of a closing cap in a view corresponding to FIG. 11.
Figure 14:
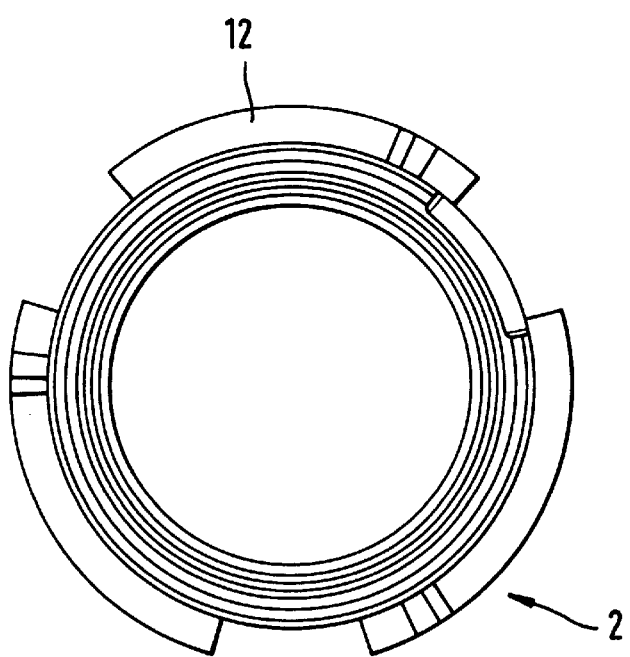
FIG. 14 shows in a view corresponding to FIG. 7 a second embodiment of a filler neck for use with the closing cap of FIG. 13.
Figure 15:
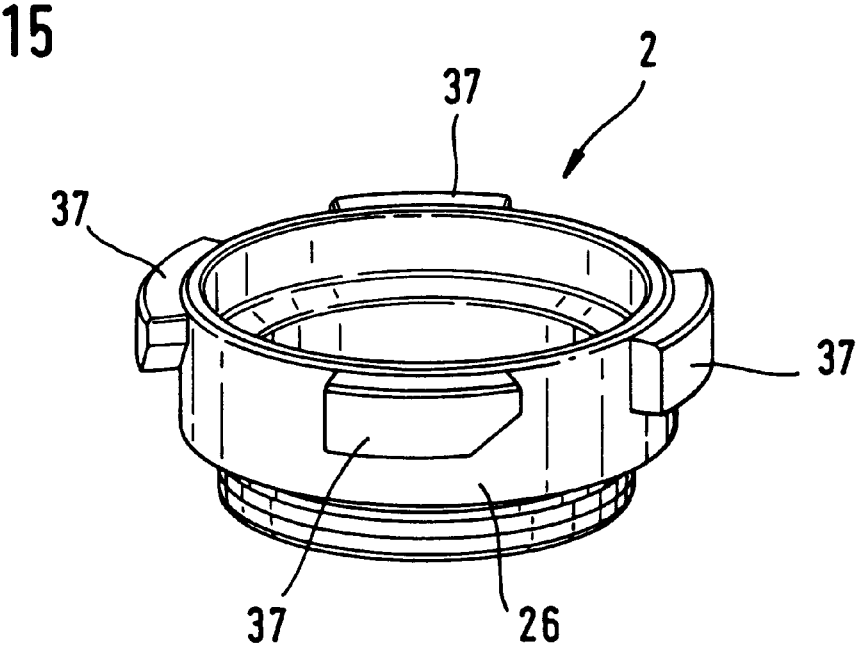
FIG. 15 shows in a view corresponding to FIG. 3 a third embodiment of a filler neck having dogs arranged thereat.
Figure 16:
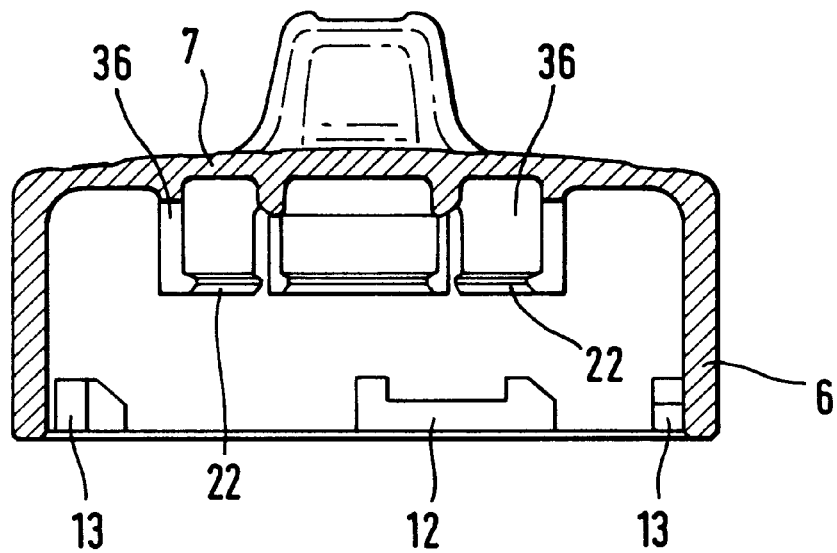
FIG. 16 shows in a view corresponding to FIG. 10 a third embodiment of a closing cap having socket elements for cooperation with the filler neck of FIG. 15.

FIGS. 13 and 14 shows another embodiment of a tank closure with three dogs 37 at the closing cap 6 and three cooperating socket elements 12 at the filler neck 2 in views similar to FIGS. 11 and 7, respectively. FIGS. 15 and 16 show an embodiment with a reverse arrangement of the dogs and the socket elements, i.e., FIG. 15 shows the filler neck 2 with dogs 37 on the torus 26 and FIG. 16 shows the cap 6 with socket elements 12, 13.

The present invention is, of course, in no way restricted to the specific disclosure of the specification and drawings, but also encompasses any modifications within the scope of the appended claims.

What I claim is:

1. A tank closing device for a container, said tank closing device comprising:
    a filler neck connected to the container;
    a closing member received in said filler neck;
    a closing cap securable at said filler neck by a bayonet fitting;
    said closing member having a sealing element;
    a spring supported on said closing cap and biasing said sealing element against said filler neck;
    said closing cap having a top face and a gripping member projecting upwardly from said top face;
    said bayonet fitting comprising at least three socket elements at a circumferential surface of said closure cap and comprising at least three dogs arranged at a circumferential surface of said filler neck and cooperating with said at least three socket elements;
    wherein said socket elements are unevenly distributed over said circumferential surface of said closing cap and said dogs are unevenly distributed over said circumferential surface of said filler neck.

2. A tank closing device according to claim 1, wherein at least one spacing between two adjacent ones of said dogs in a circumferential direction is different from another spacing between two adjacent ones of said dogs.

3. A tank closing device according to claim 1, wherein at least one spacing between two adjacent ones of said socket elements in a circumferential direction is different from another spacing between two adjacent ones of said socket elements.

4. A tank closing device according to claim 1, wherein at least one of said dogs has a circumferential length that is different from a circumferential length of another one of said dogs.

5. A tank closing device according to claim 1, wherein at least one of said socket elements has a circumferential length that is different from a circumferential length of another one of said socket elements.

6. A tank closing device according to claim 1, wherein four of said dogs and four of said socket elements are provided.

7. A tank closing device according to claim 1, wherein an even number of said dogs is provided and wherein diametrically opposed ones of said dogs are of identical design.

8. A tank closing device according to claim 1, wherein an even number of said socket elements is provided and wherein diametrically opposed ones of said socket elements are of identical design.

9. A tank closing device according to claim 1, wherein two of said socket elements have a circumferential length of 53°.

10. A tank closing device according to claim 1, wherein two of said socket elements have a circumferential length of 65°.

11. A tank closing device according to claim 1, wherein a spacing between two adjacent ones of said socket elements is 30°.

12. A tank closing device according to claim 1, wherein two of said socket elements have an end stop at a rearward end thereof in a closing direction of said bayonet closure.

13. A tank closing device according to claim 1, wherein said socket elements have a run-in slopes at a forward end thereof in a closing direction of said bayonet closure, further have a section of maximum height adjacent to said run-in slopes, and further have a bearing section, having a height reduced relative to said section of maximum height, positioned adjacent to said section of maximum height.

14. A tank closing device according to claim 1, wherein two of said socket elements have an end stop at a rearward end thereof in a closing direction of said bayonet closure, wherein said end stops have an incline at a side thereof facing an adjacent one of said socket elements.

15. A tank closing device according to claim 1, wherein said gripping member comprises first and second diametrically opposed shoulders, said shoulders having an orifice at front ends thereof.

16. A tank closing device according to claim 1, wherein said filler neck has an internal diameter and a portion for guiding said closing member, wherein said portion has a length of 0.4 times said internal diameter.

17. A tank closing device according to claim 1, further comprising a sealing membrane positioned concentrically to said closing member, said sealing membrane sealingly resting on said closing cap and an annular surface of said filler neck.

18. A tank closing device according to claim 1, wherein said filler neck is a ring body adaptable to the container.

19. A tank closing device according to claim 1, wherein a spacing between three of said dogs is such that a first spacing between a first and a second one of said dogs extends over an angle of 58° and wherein a second spacing between a second and a third one of said dogs extends over an angle of 72°.

20. A tank closing device according to claim 19, wherein said dogs have a circumferential length of 25°.

21. A tank closing device according to claim 1, wherein said closing cap has a bottom comprising a mounting fixture for securing said closing member.

22. A tank closing device according to claim 21, wherein said mounting fixture is comprised of a plurality of ring segments having free ends with radial shoulders.

23. A tank closing device according to claim 22, wherein said closing member has an end face snap-connected to said mounting fixture.

24. A tank closing device for a container, said tank closing device comprising:
    a filler neck connected to the container;
    a closing member received in said filler neck;
    a closing cap securable at said filler neck by a bayonet fitting;
    said closing member having a sealing element;
    a spring supported on said closing cap and biasing said sealing element against said filler neck;
    said closing cap having a top face and a gripping member projecting upwardly from said top face;

said bayonet fitting comprising at least three dogs at a circumferential surface of said closure cap and comprising at least three socket elements arranged at a circumferential surface of said filler neck and cooperating with said at least three dogs;

wherein said dogs are unevenly distributed over said circumferential surface of said closing cap and said socket elements are unevenly distributed over said circumferential surface of said filler neck.

25. A tank closing device according to claim 24, wherein at least one spacing between two adjacent ones of said dogs in a circumferential direction is different from another spacing between two adjacent ones of said dogs.

26. A tank closing device according to claim 24, wherein at least one spacing between two adjacent ones of said socket elements in a circumferential direction is different from another spacing between two adjacent ones of said socket elements.

27. A tank closing device according to claim 24, wherein at least one of said dogs has a circumferential length that is different from a circumferential length of another one of said dogs.

28. A tank closing device according to claim 24, wherein at least one of said socket elements has a circumferential length that is different from a circumferential length of another one of said socket elements.

29. A tank closing device according to claim 24, wherein four of said dogs and four of said socket elements are provided.

30. A tank closing device according to claim 24, wherein an even number of said dogs is provided and wherein diametrically opposed ones of said dogs are of identical design.

31. A tank closing device according to claim 24, wherein an even number of said socket elements is provided and wherein diametrically opposed ones of said socket elements are of identical design.

32. A tank closing device according to claim 24, wherein two of said socket elements have a circumferential length of 53°.

33. A tank closing device according to claim 24, wherein two of said socket elements have a circumferential length of 65°.

34. A tank closing device according to claim 24, wherein a spacing between two adjacent ones of said socket elements is 30°.

35. A tank closing device according to claim 24, wherein two of said socket elements have an end stop at a rearward end thereof in a closing direction of said bayonet closure.

36. A tank closing device according to claim 24, wherein said socket elements have a run-in slope at a forward end thereof in a closing direction of said bayonet closure, further have a section of maximum height adjacent to said run-in slopes, and further have a bearing section, having a height reduced relative to said section of maximum height, positioned adjacent to said section of maximum height.

37. A tank closing device according to claim 24, wherein two of said socket elements have an end stop at a rearward end thereof in a closing direction of said bayonet closure, wherein said end stops have an incline at a side thereof facing an adjacent one of said socket elements.

38. A tank closing device according to claim 24, wherein said gripping member comprises first and second diametrically opposed shoulders, said shoulders having an orifice at front ends thereof.

39. A tank closing device according to claim 24, further comprising a sealing membrane positioned concentrically to said closing member, said sealing membrane sealingly resting on said closing cap and an annular surface of said filler neck.

40. A tank closing device according to claim 24, wherein said filler neck is a ring body adaptable to the container.

41. A tank closing device according to claim 24, wherein said filler neck has an internal diameter and a portion for guiding said closing member, wherein said portion has a length of 0.4 times said internal diameter.

42. A tank closing device according to claim 24, wherein a spacing between three of said dogs is such that a first spacing between a first and a second one of said dogs extends over an angle of 58° and wherein a second spacing between a second and a third one of said dogs extends over an angle of 72°.

43. A tank closing device according to claim 42, wherein said dogs have a circumferential length of 25°.

44. A tank closing device according to claim 24, wherein said closing cap has a bottom comprising a mounting fixture for securing said closing member.

45. A tank closing device according to claim 44, wherein said mounting fixture is comprised of a plurality of ring segments having free ends with radial shoulders.

46. A tank closing device according to claim 45, wherein said closing member has an end face snap-connected to said mounting fixture.

* * * * *